US012770949B2

(12) United States Patent
Lipperheide et al.

(10) Patent No.: US 12,770,949 B2
(45) Date of Patent: Oct. 20, 2026

(54) BATTERY COOLING ELEMENT, BATTERY MODULE UNIT AND METHOD FOR MANUFACTURING A BATTERY COOLING ELEMENT

(71) Applicant: KAUTEX TEXTRON GmbH & Co. KG, Bonn (DE)

(72) Inventors: Moritz Lipperheide, Bonn (DE); Hartmut Wolf, Konigswinter (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 629 days.

(21) Appl. No.: 17/796,414

(22) PCT Filed: Nov. 26, 2020

(86) PCT No.: PCT/EP2020/083496
§ 371 (c)(1),
(2) Date: Jul. 29, 2022

(87) PCT Pub. No.: WO2021/151550
PCT Pub. Date: Aug. 5, 2021

(65) Prior Publication Data

US 2023/0344032 A1 Oct. 26, 2023

(30) Foreign Application Priority Data

Jan. 31, 2020 (DE) ......................... 102020102523.8

(51) Int. Cl.
*H01M 10/613* (2014.01)
*H01M 10/653* (2014.01)
(Continued)

(52) U.S. Cl.
CPC ....... *H01M 10/613* (2015.04); *H01M 10/653* (2015.04); *H01M 10/6551* (2015.04);
(Continued)

(58) Field of Classification Search
CPC ............. H01M 10/613; H01M 10/653; H01M 10/6556; H01M 10/6557
See application file for complete search history.

(56) References Cited

U.S. PATENT DOCUMENTS 11,637,337 B2 4/2023 Gaigg et al.
2007/0159799 A1 7/2007 Dando et al.

FOREIGN PATENT DOCUMENTS

DE 102008059955 6/2010
DE 102011075820 11/2012
(Continued)

OTHER PUBLICATIONS

Polyolefin, https://www.malvernpanalytical.com/en/learn/knowledge-center/insights/what-are-polyolefins (Year: 2017).*
(Continued)

*Primary Examiner* — Kevin E Yoon
(74) *Attorney, Agent, or Firm* — Lee & Hayes, P.C.

(57) ABSTRACT

A battery cooling element, a battery module, and a method for manufacturing a battery cooling element. The battery cooling element has a flexible top side in the form of a flexible multilayer composite film. To cool a battery cell and/or a battery module, the heat transfer from the battery cell and/or the battery module into a cooling medium takes place through the comparatively low-cost and lightweight multilayer composite film, which has a high heat transfer coefficient.

19 Claims, 9 Drawing Sheets

Figure 1:
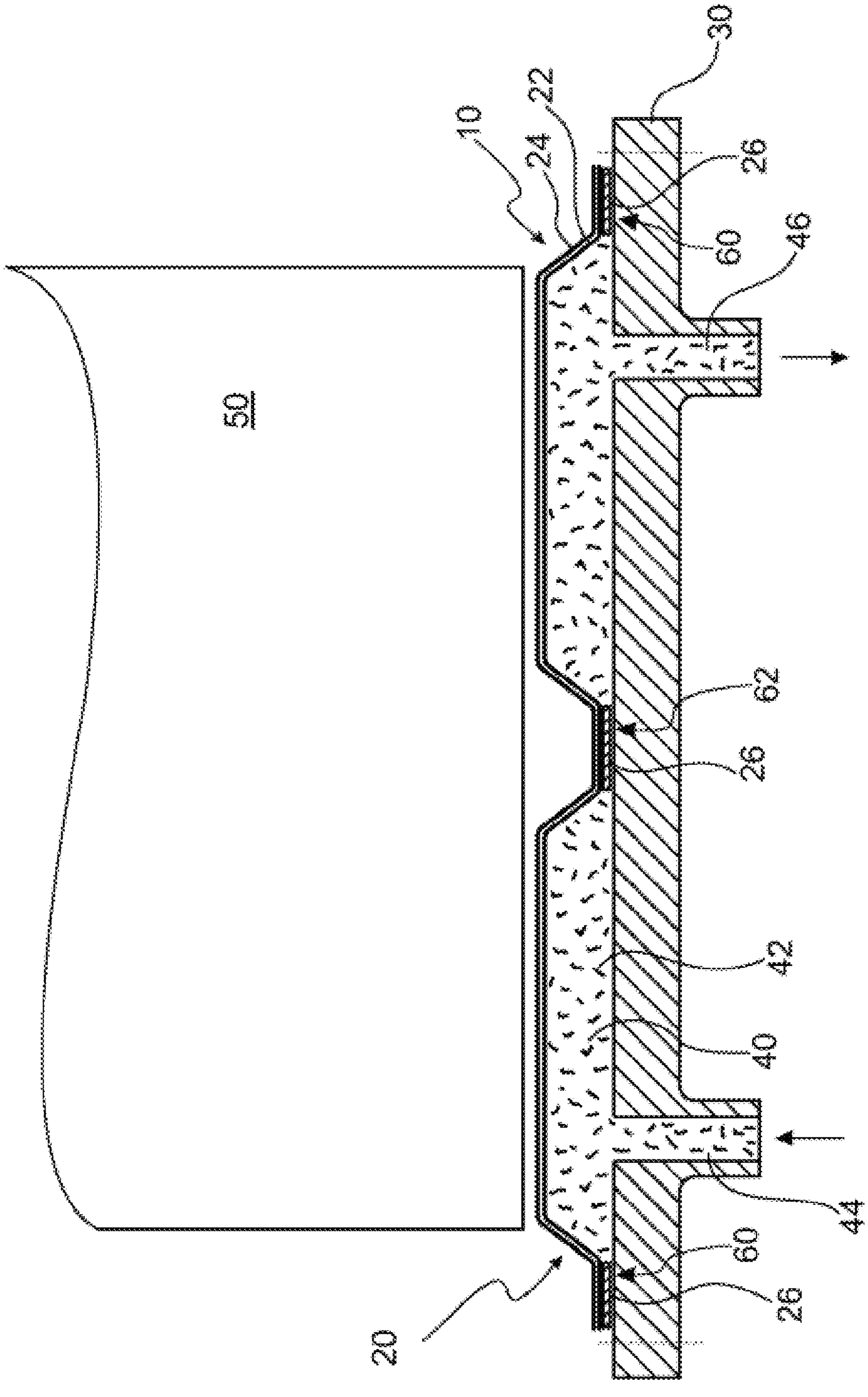

(51) Int. Cl.

| | |
|---|---|
| ***H01M 10/6551*** | (2014.01) |
| ***H01M 10/6556*** | (2014.01) |
| ***H01M 10/6557*** | (2014.01) |
| ***H01M 10/6561*** | (2014.01) |
| ***H01M 10/6567*** | (2014.01) |
| ***H01M 50/262*** | (2021.01) |

(52) U.S. Cl.

CPC ... *H01M 10/6561* (2015.04); *H01M 10/6567* (2015.04); *H01M 50/262* (2021.01)

(56) References Cited

FOREIGN PATENT DOCUMENTS

| | | | | | |
|---|---|---|---|---|---|
| DE | 102011075820 | A1 | * | 11/2012 | H01M 10/613 |
| DE | 102012217367 | A1 | * | 3/2014 | B60L 50/64 |
| DE | 102014220848 | | | 4/2016 | |
| DE | 102015201294 | | | 7/2016 | |
| DE | 102017210343 | | | 12/2018 | |
| FR | 2782399 | A1 | * | 2/2000 | F28D 1/06 |
| GB | 2561211 | A | * | 10/2018 | B60K 1/04 |
| JP | 2014-107038 | A | | 6/2014 | |
| JP | 2017062985 | | | 3/2017 | |
| WO | WO2019051520 | | | 3/2019 | |

OTHER PUBLICATIONS

PCT International Preliminary Report on Patentability for corresponding PCT Application No. PCT/EP2020/083496 dated Aug. 11, 2022, 6 pages.

PCT Search Report from corresponding PCT Application No. PCT/EP2020/083496 dated Feb. 24, 2021, 5 pages.

Japanese Notice of Reasons for Rejection for corresponding Japanese Patent Application No. 2022-546512 1 dated Aug. 28, 2023, 18 pages.

* cited by examiner

BATTERY COOLING ELEMENT, BATTERY MODULE UNIT AND METHOD FOR MANUFACTURING A BATTERY COOLING ELEMENT

This Application claims No. priority to PCT Application PCT/EP2020/083496, filed Nov. 26, 2020, which claims priority to DE Patent Application No. 10 2020 102 523.8, filed Jan. 31, 2020, the contents of each of which is incorporated herein by reference.

This patent application claims the priority of German patent application 10 2020 102 523.8, the disclosure of which is hereby explicitly referred to.

The invention relates to a battery cooling element, a battery module unit, and a method for manufacturing a battery cooling element.

In particular, the invention relates to a battery cooling element having a main body and a deep-drawn multilayer composite film, the multilayer composite film having a metal material on at least part of the surface facing the interior.

Battery module units, in particular battery module units designed for use in a motor vehicle, usually comprise a housing in which one or more battery modules or two or more battery cells, which can be combined to form battery modules, are arranged. Since the battery modules emit heat during charging and/or discharging, one or more battery cooling elements are usually also arranged in the housing, which are designed to absorb the heat from the battery modules and transport it out of the housing. In m particular, battery cooling elements in the form of a heat exchanger through which a cooling medium flows are known.

Battery cooling elements which are rigid in comparison to a battery module and/or a combination of battery cells are also known in the prior art. In particular, such a battery cooling element can be arranged on the underside of the housing of a battery module unit.

As part of a functional integration, both the heat transfer function and the function of a stiffening element for the battery module unit can be taken over by the battery cooling element, as a result of which weight savings for a battery module unit are possible.

Different deformation behavior can occur during the operation of a battery module unit, in particular when comparing a battery cooling element and a battery module, and/or a combination of battery cells and a battery cooling element.

In order to ensure sufficient heat transfer between a battery module and/or a battery cell and a battery cooling element, it is known in the prior art to provide a thermally conductive element between a battery cooling element and a battery module and/or a battery cell, in particular in the form of a thermal paste and/or a thermally conductive film.

The problem addressed by the invention is that of providing an improvement over or an alternative to the prior art.

According to a first aspect of the invention, the problem is solved by a battery cooling element, in particular a battery cooling element for a traction battery, having a main body and a multilayer composite film, the main body and the multilayer composite film at least partially enclosing an interior of the battery cooling element for receiving a cooling medium, the interior being connected to a cooling medium inflow and a cooling medium outflow, the multilayer composite film being three-dimensionally shaped.

In this regard, the following is explained conceptually:

It should first be explicitly pointed out that in the context of the present patent application, indefinite articles, and numbers such as “one,” “two,” etc., should generally be understood as “at least” statements, i.e., as “at least one . . . ,” “at least two . . . ,” etc., unless it is clear from the relevant context or it is obvious or technically imperative to a person skilled in the art that only “exactly one . . . ,” “exactly two . . . ” etc., can be meant.

In the context of the present patent application, the expression “in particular” should always be understood to introduce an optional, preferred feature. The expression should not be understood to mean “specifically” or “namely.”

A “battery cooling element” should be understood to mean a device which is designed to cool a battery cell and/or a battery module. The heat emanating from the battery cell and/or the battery module is preferably dissipated from the battery cooling element by means of a cooling medium.

The battery cooling element preferably comprises an outer surface for at least partially abutting a battery cell or a battery module of a battery module unit that has at least two battery cells, an interior for receiving a cooling medium, which interior is at least partially surrounded by the outer surface, a cooling medium inflow connected to the interior, and a cooling medium outflow connected to the interior, wherein the outer surface consists at least partially of a thermally conductive, flexible multilayer composite film.

A “traction battery” should be understood to mean an energy storage device, in particular an energy storage device for electrical power. A traction battery is preferably suitable for installation in and for driving electric cars.

A “main body” should be understood to mean a component of a battery cooling element which, at least with regard to the battery cooling element, is structurally designed as a load-bearing component, so that it is designed to be able to dissipate the mechanical loads occurring in the battery cooling element to surrounding components.

A “film” should be understood to mean a thin sheet of metal or plastic.

A “multilayer composite film” should be understood to mean a film which has a plurality of layers.

Different materials can preferably be combined in one multilayer composite film.

The multilayer composite film can preferably have a plastics material and a metal material, each of which is in the form of a film layer. If the multilayer composite film preferably has a metal material, this can advantageously improve an electromagnetic compatibility (EMC) of the multilayer composite film. Electromagnetic compatibility describes the ability of an element not to interfere with other elements through undesired electrical or electromagnetic effects or not to be interfered with by other elements.

A multilayer composite film consisting of at least two material layers is preferably envisaged as a multilayer composite film. A multilayer composite film which has two material layers at least over part of the surface thereof is particularly preferably envisaged as a multilayer composite film. In particular, a multilayer composite film which has a first layer over the entire surface thereof and which has a second material layer over at least part of the surface thereof, in particular a plastics material as the first material layer and a metal material as the second material layer, is conceivable.

A multilayer composite film can be produced in particular by means of a calender.

A material layer of a multilayer composite film preferably comprises a metal material. A material layer of a multilayer composite film preferably comprises a plastics material.

A multilayer composite film having an outwardly oriented plastics layer is preferably envisaged as a multilayer composite film. The outwardly oriented plastics layer can preferably be designed to advantageously protect a second material layer, in particular a metal layer, which is covered by the plastics layer, from external influences.

A multilayer composite film preferably has a thickness of between 60 and 150 μm. A multilayer composite film particularly preferably has a thickness of between 80 and 125 μm.

It is explicitly pointed out that the above values for the thickness of the multilayer composite film should not be understood as strict limits; rather, it should be possible to exceed or fall below them on an engineering scale without departing from the described aspect of the invention. In simple terms, the values should provide an indication of the size of the thickness of the multilayer composite film proposed here.

A film which comprises different metal materials, in particular in different layers of the multilayer composite film, can be envisaged as a multilayer composite film.

Furthermore, it is also possible for a multilayer composite film to be formed from a plurality of different plastics materials.

A multilayer composite film having an outwardly oriented first material layer, in particular consisting of a plastics material, a second material layer covered by the first material layer, in particular consisting of a metal material, and at least a third material layer which faces the interior and in particular consists of a plastics material, wherein the second and the third material layer can also extend over part of the surface, is preferably envisaged as a multilayer composite film.

A multilayer composite film having a first outwardly oriented material layer which extends over its entire surface and a second material layer which is marked over at least part of the surface and in particular consists of a plastics material, wherein the second material layer is designed to be connected, in particular integrally or interlockingly, in particular welded, to the main body, is preferably envisaged as a multilayer composite film.

An "interior" should be understood to mean a region of a battery cooling element which is substantially enclosed by the main body and the multilayer composite film. Furthermore, the interior is delimited by a cooling medium inflow and a cooling medium outflow.

A "cooling medium" should be understood to mean, in particular, a gaseous and/or liquid substance or a gaseous and/or liquid mixture of substances which can be used to dissipate heat.

A "cooling medium inflow" should be understood to mean an opening in the interior which is designed for feeding a designated cooling medium into the battery cooling element.

A "cooling medium outflow" should be understood to mean an opening in the interior that is designed to discharge a designated cooling medium from the battery cooling element.

A "three-dimensionally shaped" film or multilayer composite film should be understood to mean a film or a multilayer composite film which, after the primary forming of the film or multilayer composite film, has been shaped in such a way that it is no longer purely flat, but rather extends in all three dimensions, in particular extends in all three dimensions without the action of external forces, and in particular extends in all three dimensions in its stress-free state.

In other words, a three-dimensionally shaped film or three-dimensionally shaped multilayer composite film means a film or multilayer composite film that has been three-dimensionally reshaped by means of a reshaping process after being primary-formed into a flat film or a flat multilayer composite film, in particular three-dimensionally reshaped without creases. As a result, a film or multilayer composite film that has already been reshaped is no longer flat. If a reshaped film or multilayer composite film is placed on a flat surface under the action of gravity, it will have bumps and/or creases, in contrast with a primary-formed flat film or multilayer composite film.

The three-dimensionally reshaped film or the three-dimensionally reshaped multilayer composite film preferably has at least one central region and one edge region, each of which is flat, with the at least one central region and the at least one edge region being arranged on different, preferably parallel planes, with the at least one flat-shaped central region and the at least one flat-shaped edge region being connected by means of a connecting region, wherein the connecting region connects the different planes of the at least one central region and the at least one edge region to one another, preferably without creases.

The film or multilayer composite film is preferably reshaped before it is connected to the main body of the battery cooling element.

The film or multilayer composite film is preferably reshaped after it has been connected to the main body of the battery cooling element.

The three-dimensionally shaped film or the three-dimensionally shaped multilayer composite film preferably has no creases, at least as long as no external forces are acting on the shaped film or shaped multilayer composite film.

The three-dimensionally shaped film or shaped multilayer composite film is preferably three-dimensionally shaped by means of combined tensile and compressive molding, deep-drawing, pressing, tube hydroforming, hydroforming, or another reshaping process.

A "deep-drawn" multilayer composite film should be understood to mean a multilayer composite film that has been shaped by means of a deep-drawing process.

In the case of the battery cooling element proposed here, a film or a multilayer composite film is preferably used which, in its designated use form and/or in its three-dimensionally shaped form and/or in the installed state of the battery cooling element, has a first plane which is designed for connection, in particular integral or interlocking connection, to the main body, and has at least one second plane which is designed for the most extensive possible contact with at least one battery cell.

Preferably, the second plane designed for contact with the at least one battery cell is raised in its designated abutment region with the at least one battery cell from the first plane, which is designed for connection, in particular integral or interlocking connection, to the main body.

It is known in the prior art that battery cells and/or battery modules, in particular for use in a traction battery, are cooled by means of a heat sink, the heat sink being designed as a metal plate.

Such heat sinks have the disadvantage of being comparatively heavy and require a thermally conductive material, in particular thermal pastes and/or thermally conductive films or the like, in order to improve the heat transfer between the battery cell and/or battery module and the heat sink, and/or between the heat sink and the housing to which the heat is intended to be dissipated. The usually comparatively elastic thermally conductive material is placed between the two metal surfaces and can thus also compensate for tolerances between the metal surfaces. However, the thermally conductive materials are expensive, difficult to apply, and also have a thermal conductivity resistance which, overall, leads to an improvement in heat transfer, but still does not represent an optimal solution for efficient heat transfer.

As an alternative to this, a battery cooling element having a main body and a film or a multilayer composite film is proposed here. Furthermore, the battery cooling element proposed here has an interior through which a cooling medium is intended to flow.

According to the intended use of the battery cooling element proposed here, the heat generated in the battery cell and/or the battery module can be transferred to the cooling medium through the indirect contact between the battery cell and/or the battery module and the cooling medium. The heat transferred to the cooling medium can be dissipated by a designated cooling medium circuit and, in particular, can be dissipated to the environment by means of a designated additional heat exchanger.

The film or the multilayer composite film is designed to be connected to the battery cell and/or the battery module.

The outer surface of the battery cooling element proposed here is therefore designed to be relatively flexible compared with the solutions known in the prior art and has an associated malleability, by means of which any tolerances between the battery cooling element and the battery cell and/or the battery module can be compensated for; a thermally conductive material which performs this function in the prior art can therefore be advantageously dispensed with.

It should also be specifically considered that the pressure acting on the cooling medium can cause the film or multilayer composite film proposed here to at least partially abut the battery cell and/or the battery module in a designated manner and thus be deformed, preferably in the elastic region of the multilayer composite film, so that any existing geometric tolerances between the battery cooling element and the battery cell and/or battery module can be compensated for in a particularly simple manner, in particular without having to rely on a thermally conductive material.

At least partial abutment in this context means that the outer surface of the battery cooling element, which outer surface is flexibly formed by the film or multilayer composite film, does not have to extend over the entire periphery of the battery cooling element; rather, it is also possible for this specifically designed outer surface to form only part of the outer peripheral surface of the battery cooling element. The film or multilayer composite film then preferably only extends over part of the outer peripheral surface of the battery cooling element. However, it is also possible for the outer surface and therefore also the film forming the outer surface to extend over the entire outer peripheral surface of the battery cooling element.

Preferably, this results in the outer surface of the battery cooling element in the form of the film or the multilayer composite film coming into abutment with the battery cell to be cooled and/or the battery module to be cooled, and thus to surface-to-surface contact via which the heat transfer can take place.

Furthermore, it is specifically proposed here, for example, for the film or the multilayer composite film to be made of a thermally conductive material, so that good heat transfer can be achieved between the battery module or battery cell and the battery cooling element without having to use a thermally conductive material, in particular a thermal paste.

Furthermore, it is specifically proposed here for the film or the multilayer composite film to be characterized by a small wall thickness, as a result of which the thermal resistance between the heat source and the cooling medium can be further advantageously reduced.

A battery cooling element designed in this manner also advantageously has a significantly reduced weight by comparison with conventional battery cooling elements due to the outer surface no longer being rigid.

The battery cooling element can also have a flat design, so that it can advantageously be particularly space-efficient.

The outer surface proposed here has a film or a multilayer composite film, as a result of which the material properties of different materials combined in the multilayer composite film can be advantageously combined with one another.

Preferably, the outer surface of the battery cooling element formed by the multilayer composite film can thus advantageously have a high modulus of elasticity, and thus a comparatively high stability, despite the low material thickness.

Furthermore, the multilayer composite film can advantageously have increased tensile strength and/or tear strength depending on the combined materials, so that damage to the multilayer composite film can be avoided even when higher loads act on the multilayer composite film.

It is also specifically proposed here, for example, that, by combining the materials to form the multilayer composite film, other properties of the multilayer composite film can also be ideally adapted to the application provided here. The ability of the multilayer composite film to be welded to the main body in particular is considered here, it being possible for the battery cooling element to be manufactured inexpensively and designed to be robust.

In order to further increase the stability of the battery cooling element, a support element can be arranged in the interior of the battery cooling element.

The support element can form a bearing structure which can provide mechanical support for the outer surface of the battery cooling element and thus for the multilayer composite film. The support element can be used to absorb and transmit compressive loads.

The support element is preferably shaped such that it forms one or more flow channels through which the designated cooling medium can flow in the interior of the battery cooling element. The flow channel or flow channels can be designed in such a way that the flow path of the cooling medium from the cooling medium inflow to the cooling medium outflow is as long as possible, in particular by designing the designated flow path to be meandering. As a result, the battery cells and/or battery modules can be cooled particularly effectively.

The support element can, for example, be designed as a framework in order to support the outer surface of the battery cooling element. The support element is preferably made of a rigid material, in particular a rigid plastics material. However, it is also possible for the support element to be made of a metal material.

In this case, a battery cooling element having a film or a multilayer composite film which is three-dimensionally shaped, for example, is specifically proposed. In other words, a battery cooling element which has a film or a multilayer composite film which has been three-dimensionally shaped by means of a reshaping process, in particular deep-drawing or tube hydroforming, is proposed here.

By using a three-dimensionally shaped film or the three-dimensionally shaped multilayer composite film, it is advantageously possible for the desired curved shape of the film or multilayer composite film intended for use to produce no bulging creases that could disadvantageously reduce the contact surface between the film or the multilayer composite film and the battery cell and/or the battery module. In other words, by reshaping, in particular deep-drawing or tube hydroforming, the film or the multilayer composite film, the film or the multilayer composite film can be conditioned in such a way that it does not have any creases in the shape designated for use. In this way, the shape and positional tolerances of the battery cooling element intended to be achieved, in particular in the contact region with the battery cell and/or the battery module, can be advantageously improved, as a result of which the heat transfer can also be improved.

Furthermore, the choice of material can advantageously be adapted by using a film or a multilayer composite film which is three-dimensionally shaped, in particular deep-drawn or tube-hydroformed. Shaping the film or the multilayer composite film by means of reshaping, in particular deep-drawing or tube hydroforming, means that the film or the multilayer composite film advantageously no longer has to be so adaptable. In other words, the film or the multilayer composite film can thus have a higher modulus of elasticity and a lower elasticity, which advantageously makes it possible for the film or the multilayer composite film to have a higher durability; in particular, a higher bursting pressure of the film or the multilayer composite film can be advantageously achieved in this way.

The main body preferably has a groove and/or an indentation.

In this regard, the following is explained conceptually:

A "groove" should be understood to mean a depression in the main body, of which the longitudinal extension is greater than the transverse extension.

An "indentation" should be understood to mean a depression in the main body, of which the transverse extension is greater than the longitudinal extension.

In this way, the interior for the designated cooling medium can advantageously not only be shaped by deforming the multilayer composite film, but also at least partially shaped in the main body, as a result of which the deformation of the multilayer composite film can be advantageously limited and any supporting frame for supporting a battery cell and/or a battery module can also have a smaller extension.

In other words, the amount of tension in the multilayer composite film can be limited, and in particular can even be limited to compensating for the positional tolerance between the battery cell and/or the battery module and the battery cooling element in a particularly advantageous configuration.

The multilayer composite film preferably has a welding region.

In this regard, the following is explained conceptually:

A "welding region" should be understood to mean a region of the multilayer composite film that is designed such that the multilayer composite film can be welded to the main body. The welding region preferably has a plastics layer on the surface of the multilayer composite film which can be welded to the main body.

A battery cooling element in which the main body and the multilayer composite film are welded to one another is therefore specifically proposed here.

The welding region of the multilayer composite film is preferably sprayed onto the surface of the multilayer composite film, particularly preferably only in the region in which the multilayer composite film is welded to the main body.

For example, a multilayer composite film is envisaged which has a layer consisting of metal material on the surface facing the interior, onto which layer a plastics layer is applied, in particular sprayed, at the points relevant for welding, whereby a welding region is formed.

A "surface" of the multilayer composite film "facing the interior" should be understood to mean the side of a multilayer composite film that corresponds to the interior of the battery cooling element according to the intended arrangement of the multilayer composite film.

The surface of the multilayer composite film facing the interior is preferably welded to the base plate of the battery cooling element. At the point of a weld, the multilayer composite film is then no longer facing the interior, since it is integrally connected to the main body. However, this does not change anything on the side of the multilayer composite film facing the interior of the battery cooling element.

Furthermore, a multilayer composite film is specifically envisaged which has a layer consisting of plastics material on the surface facing the interior, onto which layer an additional plastics layer is applied, in particular sprayed, at the points relevant for welding, whereby a welding region is formed. Even if the surface of the multilayer composite film facing the interior already has a layer of plastics material, it should preferably also be considered that this cannot be welded to the main body, and therefore an additional welding region made of plastic is required. A material layer consisting of plastics material may not be weldable to the main body, for example, if the layer of plastics material is too thin to be welded, which means that no connection can be made to the main body, or if it comprises a plastics material that cannot be welded to the plastics material of the main body.

The welding region advantageously allows the multilayer composite film and the main body to be integrally connected to one another by means of welding.

The multilayer composite film preferably has a metal material on at least part of the surface facing the interior.

"Part of the surface" should be understood to mean that the surface of one side of a multilayer composite film can be divided into regions of different surface materials. An associated partial surface or region is delimited by the change in surface material.

A "metal material" is preferably understood to mean a material which consists predominantly, i.e., contains at least 70 wt. %, of aluminum or copper.

According to a conceivable embodiment of the multilayer composite film, it has a layer of metal material and a layer of plastics material, the metal material being arranged toward the interior and the plastics material being arranged on the side of the multilayer composite film facing away from the interior.

Using a multilayer composite film having a layer made of a metal material oriented toward the interior and a layer made of a plastics material facing away from the interior, it is advantageously possible that, despite the use of a plastics layer, a comparatively good heat transfer coefficient can still be advantageously achieved by the multilayer composite film; in particular, the heat transfer coefficient can be improved compared with a multilayer composite film which has a layer of metal material as the middle layer over at least large parts of its extent, in particular over its entire extent, and a layer of plastics material on each of the outer layers.

According to a specific embodiment of a multilayer composite film proposed here, having a layer consisting of a metal material oriented toward the interior and a layer consisting of a plastics material facing away from the interior, it is envisaged that the multilayer composite film comprises both material layers over its entire extent.

In order to achieve weldability of the multilayer composite film with the main body, it is also proposed that a further plastics layer, in particular a welding region, which can be welded to the plastic of the main body, be applied to the metal material at least in the region of the designated weld.

According to a further specific embodiment of a multilayer composite film having a layer consisting of a metal material oriented toward the interior and a layer consisting of a plastics material facing away from the interior, it is envisaged that the multilayer composite film has an outer plastics layer over its entire extent, whereas the metal layer oriented toward the interior is interrupted in the region that is intended to be welded to the main body. In this way, it advantageously possible for no further plastics layer to be applied to the multilayer composite film for the weldability of the multilayer composite film to the main body.

Preferably, a region of the multilayer composite film facing the interior and having the metal material on the surface is designed to have a higher heat transfer coefficient than an adjoining region of the multilayer composite film facing the interior and having the metal material on the surface.

In this regard, the following is explained conceptually:

A "heat transfer coefficient" should be understood to mean a proportionality factor that determines the intensity of the heat transfer through the multilayer composite film. It is a specific index of a configuration of materials.

A battery cooling element is now specifically proposed here which has a multilayer composite film which is designed according to its material selection and according to its material arrangement in such a way that a first region designed for contact with the battery cell and/or the battery module has a higher heat transfer coefficient than an adjacent second region, in particular an adjacent second region, which is designed for connection, in particular an integral or interlocking connection, in particular an integral connection by means of welding, of the multilayer composite film to the main body.

A multilayer composite film is preferably envisaged which has a metal layer on the side facing the interior, with a plastics layer being applied to the metal layer in the second region intended for welding, which is also oriented toward the interior of the battery cooling element.

This advantageously allows the multilayer composite film to have a higher heat transfer coefficient in the region relevant to efficient heat transfer than in the adjoining region, particularly in the adjoining region that is designed for welding to the main body, which is preferably not in direct contact with a battery cell and/or a battery module.

According to a preferred embodiment, the metal material has aluminum as an alloy component, the metal material preferably having an aluminum content of more than 85 wt. %, and the metal material particularly preferably having an aluminum content of more than 95 wt. %.

In this regard, the following is explained conceptually:

An "alloy component" should be understood to mean a component of a metal within an alloy comprising a plurality of metals.

The "aluminum content in wt. %" should be understood to mean the proportion of the chemical element aluminum in an alloy containing a plurality of elements, with the proportion being given as a percentage based on the total mass of the alloy.

By using aluminum as the metal material, a high thermal conductivity of the metal layer can advantageously be achieved, so that, overall, a battery cooling element which is efficient in terms of heat transfer can be achieved.

The metal material preferably has an aluminum content of more than 70 wt. %. The metal material preferably has an aluminum content of more than 75 wt. %. The metal material preferably has an aluminum content of more than 80 wt. %. The metal material preferably has an aluminum content of more than 90 wt. %. The metal material preferably has an aluminum content of more than 97 wt. %. The metal material preferably has an aluminum content of more than 98.5 wt. %.

It should be explicitly pointed out that the above values for the aluminum content should not be understood as strict limits; rather, it should be possible to exceed or fall below them on an engineering scale without departing from the described aspect of the invention. In simple terms, the values are intended to provide an indication of the size of the aluminum content.

According to an optional embodiment, the metal material has copper as an alloy component.

The metal material preferably has a copper content of more than 70 wt. %, preferably more than 75 wt. %, preferably more than 80 wt. %, preferably more than 85 wt. %, preferably more than 90 wt. %, preferably more than 95 wt. %, and preferably more than 98.5 wt. %.

A high thermal conductivity of the metal layer can advantageously be achieved through the use of copper as an alloy component of the metal layer, so that, overall, a battery cooling element which is efficient in terms of heat transfer can be achieved. Optionally, the region of the multilayer composite film having the metal material on the surface facing the interior substantially corresponds to a region of the multilayer composite film that is designed for contact with a battery module and/or a battery cell.

In this regard, the following is explained conceptually:

A "battery cell" should be understood to mean a store for electrical energy on an electrochemical basis.

A "battery module" should be understood to mean a part of a battery module unit, with the battery module having a plurality of battery cells.

The region of the multilayer composite film which is "designed for contact with a battery module and/or a battery cell" should be understood to mean the region of a multilayer composite film designated to come into contact with a battery module and/or a battery cell.

It is now proposed for the multilayer composite film to have a metal layer which is substantially at least as large as the m region which is designated to be brought into contact with a battery cell and/or a battery module.

In this way, it is advantageously possible to achieve a battery cooling element which has a high heat transfer coefficient in the designated contact region with the battery cell and/or the battery module, so that efficient heat transfer can be achieved, while in the adjacent regions the material properties of the multilayer composite film can be adapted to the local requirements, in particular to the weldability with the main body.

Substantially should be understood to mean a region which is at least 80% congruent, preferably a region which is at least 90% congruent, preferably a region which is at least 95% congruent, particularly preferably a region which is at least 98% congruent.

The multilayer composite film preferably has a plastics material on at least part of the surface facing the interior.

In this regard, the following is explained conceptually:

A "plastics material" should be understood to mean a material that mainly consists of macromolecules.

A plastics material can preferably be understood to mean a polyethylene, in particular a polyethylene modified to be tear-resistant, and/or a polyisobutylene and/or a polyvinyl butyral and/or an ethylene vinyl acetate and/or a polyacrylate and/or a polymethylene acrylate and/or a polyurethane and/or a pre-stretched polypropylene and/or a polyvinyl acetate 5 and/or an ethylene vinyl acetate and/or a urethane-based thermoplastic elastomer.

Advantageously, this means that the plastics material on the surface of the multilayer composite film facing the interior can be adapted in such a way that it can be welded to the main body.

According to an optional embodiment, the region facing the interior and having the plastics material on the surface of the multilayer composite film substantially corresponds to a contact surface with the main body, it being possible to weld the plastics material to the main body.

In this regard, the following is explained conceptually:

A "contact surface with the main body" should be understood to mean the surface intended to come into contact with the main body or to be welded to the main body.

"Weldable" should be understood here to mean the weldability of thermoplastics, i.e., the integral connectability of thermoplastics, in particular the permanent integral connectability of thermoplastics.

Substantially should be understood to mean a region which is at least 80% congruent, preferably a region which is at least 90% congruent, preferably a region which is at least 95% congruent, particularly preferably a region which is at least 98% congruent.

In this way, the multilayer composite film can advantageously have a region-optimized configuration of materials.

According to a preferred variant, the plastics material corresponds to LDPE or PE or PA or PP.

"LDPE" should be understood to mean a low-density polyethylene.

"PE" should be understood to mean a polyethylene.

"PA" should be understood to mean a polyamide.

"PP" should be understood to mean a polypropylene.

In this way, the plastics material can advantageously be welded to a compatible main body.

The multilayer composite film preferably has a plastics material on at least part of the surface facing away from the interior.

In this regard, the following is explained conceptually:

A "surface facing away from the interior" should be understood to mean the surface of the multilayer composite film that at least partially describes the outer surface of the battery cooling element.

The multilayer composite film particularly preferably has a plastics material over the entire surface which faces away from the interior.

The metal layer of the multilayer composite film can thus advantageously be optimally protected from external influences.

According to an expedient embodiment, the plastics material is pseudoplastic.

The plastics material is particularly preferably thixotropic.

In this regard, the following is explained conceptually:

A "pseudoplastic" plastics material should be understood to mean a plastics material which has a decreasing viscosity under high shear forces. In other words, the viscosity of a pseudoplastic plastics material decreases with an increase in the shear stress acting on the plastics material.

A "thixotropic" plastics material should be understood to mean a plastics material which degrades in viscosity over time under constant shear stress. The viscosity preferably increases again as a function of time after the shear stress has ended.

The plastics material on the outside of the multilayer composite film is preferably pseudoplastic, and particularly preferably thixotropic. In other words, the plastics material intended to face the battery cell is preferably pseudoplastic, and particularly preferably thixotropic.

In this way, the plastics layer protecting the metal layer can advantageously have a lower viscosity in the event of strong shear loads, as a result of which damage to the protective plastics layer due to shear loads can advantageously be counteracted.

The main body optionally consists of LDPE or PE or PA or PP.

This can advantageously be achieved in that the main body can be made particularly lightweight and can be welded to a compatible multilayer composite film.

According to a preferred embodiment, the main body has a fastening element for fastening a battery cell and/or a battery module.

In this regard, the following is explained conceptually:

A "fastening element" should be understood to mean any device which is designed to fasten a main body to a battery cell and/or a battery module.

The main body is expediently designed to be used as a load-bearing element of a battery module unit, in particular a battery module unit of a traction battery.

In this regard, the following is explained conceptually:

A "load-bearing element" should be understood to mean a component or assembly which is not only designed to non-destructively absorb the loads that occur within the component or assembly without being destroyed, but which can be designed to non-destructively convey external loads that act on the component or assembly through the component or the assembly.

A "battery module unit" should be understood to mean a battery module system which has a plurality of battery modules.

This can advantageously be achieved by the battery module unit no longer requiring an additional load-bearing housing, as a result of which material and weight can be reduced.

The main body is optionally designed to be used as a component of the housing of a battery module unit, in particular of a battery module unit of a traction battery.

In this way, a component of the housing of a battery module unit can advantageously be reproduced by means of the main body, as a result of which material and weight for a battery module unit can advantageously be reduced.

According to a second aspect of the invention, the problem is solved by a battery module unit, in particular a battery module unit of a traction battery, having a battery cell and/or a battery module and a battery cooling element according to the first aspect of the invention.

It should be understood that the advantages of a battery cooling element according to the first aspect of the invention, as described above, extend directly to a battery module unit having a battery cell and/or a battery module and a battery cooling element according to the first aspect of the invention.

It should be explicitly noted that the subject matter of the second aspect can advantageously be combined with the subject matter of the first aspect of the invention, both individually and cumulatively in any combination.

According to a third aspect of the invention, the problem is solved by a method for manufacturing a battery cooling element, in particular a battery cooling element for a traction battery, in particular a battery cooling element according to the first aspect of the invention, wherein the battery cooling element has a main body and a three-dimensionally shaped multilayer composite film, wherein the main body and the three-dimensionally shaped multilayer composite film at least partially enclose an interior of the battery cooling element for receiving a cooling medium, comprising the following steps:

providing a film or a multilayer composite film, in particular a film or a multilayer composite film having a surface consisting of a metal material or having a plastics surface on both sides;

shaping the film or the multilayer composite film by means of a reshaping process, in particular by means of a deep-drawing process or a tube hydroforming process, to create the three-dimensionally shaped film or multilayer composite film (20); and connecting the film or multilayer composite film and the main body.

In this regard, the following is explained conceptually:

"Shaping" should be understood to mean any reshaping of a body by means of which a three-dimensional shaping can be achieved, in particular a multilayer composite film shaped in a three-dimensional manner.

Shaping should preferably be understood to mean shaping by means of a deep-drawing process.

A "deep-drawing process" should be understood to mean a reshaping process which is designed to form a hollow body that is open on one side from a film by means of combined tensile and compressive molding.

Shaping should preferably be understood to mean shaping by means of a tube hydroforming process.

A "tube hydroforming process" should be understood to mean a reshaping process in which a body, in particular a multilayer composite film, is shaped in a closed shaping tool using internal pressure. A tube hydroforming process can preferably be understood to mean a hydroforming process.

"Connecting" should be understood to mean any method which is designed for connecting the film or multilayer composite film and the main body, in particular designed for integral or interlocking connection.

In the case of an integral connection, a welding process is preferably envisaged.

In the case of a frictional connection, a flanging process and/or a kneading process in particular is envisaged.

It is explicitly pointed out that the steps of the method can be carried out in the specified order, although this is not required here. The steps can therefore explicitly also be carried out in a different order.

Furthermore, it is explicitly pointed out that the steps can be carried out at one work station or at a plurality of work stations, in particular in work stations arranged in a star shape with respect to one another.

According to a first alternative embodiment for the manufacture of a battery cooling element, it is specifically proposed here for the film or the multilayer composite film to be shaped by means of a reshaping process, in particular by means of a deep-drawing process or a tube hydroforming process, so that the desired curved shape of the three-dimensionally shaped film or three-dimensionally shaped multilayer composite film intended for use does not produce any bulging creases that could disadvantageously reduce the contact surface between the film or the multilayer composite film and the battery cell and/or the battery module.

In other words, by reshaping, in particular deep-drawing or tube hydroforming, the film or the multilayer composite film, the three-dimensionally shaped film or the three-dimensionally shaped multilayer composite film can be conditioned in such a way that it does not have any creases in the designated insert shape. In this way, the shape and positional tolerances of the battery cooling element intended to be achieved, in particular in the contact region with the battery cell and/or the battery module, can be advantageously improved, as a result of which the heat transfer can also be improved.

Furthermore, the choice of material can advantageously be adapted by reshaping, in particular deep-drawing or tube hydroforming. Shaping the film or the multilayer composite film by means of deep-drawing in particular means that the film or the multilayer composite film advantageously no longer has to be so adaptable. In other words, the film or the multilayer composite film can thus have a higher modulus of elasticity and a lower elasticity, which advantageously makes it possible for the film or the multilayer composite film to have a higher durability; in particular, a higher bursting pressure of the film or the multilayer composite film can be advantageously achieved in this way.

After shaping, the three-dimensionally shaped film or the three-dimensionally shaped multilayer composite film is preferably connected to the main body, as a result of which the battery cooling element is formed.

Specifically, according to a second alternative embodiment, it is envisaged that the provided primary-formed film or the provided primary-formed multilayer composite film is first connected to the main body and then shaped. Accordingly, a film that has been primary-formed so as to be flat or a multilayer composite film that has been primary-formed so as to be flat is only shaped after it has been connected to the main body.

In this way, the connection of the provided film or of the provided multilayer composite film can be simplified.

As an alternative to welding the film or the multilayer composite film to the main body, it is also envisaged, in the connection step, for the three-dimensionally shaped film or the three-dimensionally shaped multilayer composite film to be glued to the main body and/or interlockingly connected thereto by means of flanging and/or by a kneading process.

According to an expedient embodiment, connecting the three-dimensionally shaped multilayer composite film and the main body comprises the following steps:

at least partially applying a layer of plastics material to the film or the multilayer composite film, in particular applying the layer of plastics material to the surface consisting of a metal material or of a plastics material, it being possible to weld the applied plastics material to the main body; and welding the main body and the layer of plastics material to form a battery cooling element.

In this regard, the following is explained conceptually:

"Applying" should be understood to mean any method which is designed to deposit a layer of plastics material on a film and/or a multilayer composite film.

It is explicitly pointed out that the steps of the method can be carried out in the specified order, although this is not required here. The steps can therefore explicitly also be carried out in a different order.

It is proposed here to apply a material layer of plastics material to the film or the multilayer composite film for connection. This can be done on one side or on two sides.

According to a first variant, the layer of plastics material applied after the reshaping, in particular deep-drawing or tube hydroforming, is preferably applied only in the region of the contact region with the main body, so that it can be used for welding to the main body. After applying a layer of plastics material, it is proposed to weld the main body and the three-dimensionally shaped film or the three-dimensionally shaped multilayer composite film together to form a battery cooling element, in particular by welding the main body and the layer of plastics material.

Furthermore, according to a second variant, a layer of plastics material is applied to a provided primary-formed film or a provided primary-formed multilayer composite film, preferably only in the region of the contact region with the main body. The applied layer can then be used to weld the still-flat film or the flat multilayer composite film to the main body. In a subsequent step, the film or multilayer composite film connected to the main body can be reshaped, in particular by means of deep-drawing or tube hydroforming.

The plastics material is preferably sprayed on.

The welding of the film or multilayer composite film to the main body is preferably carried out by means of a welding tool, in particular by means of a hot stamp and/or by means of ultrasonic welding and/or by means of high-frequency welding.

The shaping of the film or the multilayer composite film and the application of the layer of plastics material are preferably carried out in one work cycle.

In this regard, the following is explained conceptually:

A "work cycle" should be understood to mean a cyclical phase when running through a repetitive process. The method steps of a work cycle are preferably carried out at a station of a machine.

This can advantageously be achieved in that a station for manufacturing a battery cooling element can advantageously be used for at least two work steps, as a result of which investment costs for a machine for manufacturing a battery cooling element can be reduced.

After the film or the multilayer composite film has been provided, the layer of plastics material is preferably first applied to the film or the multilayer composite film, and the film or the multilayer composite film is welded to the main body in the region of the applied layer of plastics material and then three-dimensionally shaped.

It is now specifically proposed here that the film or the multilayer composite film be shaped by means of a reshaping process, in particular by means of a tube hydroforming process, only after it has been welded to the main body.

The provided film or the provided multilayer composite film is preferably primary-formed so as to be flat.

Furthermore, the film or the multilayer composite film is preferably three-dimensionally shaped against a shaping die, the shaping die being contacted at least indirectly by the main body during shaping.

It should be considered here, for example, that the shaping die is pressed at least indirectly against the main body by means of a holding force. As a result, the film or the multilayer composite film can be shaped against the die using a tube hydroforming process, so that the die predetermines the final shape of the film or the multilayer composite film. For this purpose, the holding force corresponds to the pressure of the fluid by means of which the film or the multilayer composite film is pressed against the die, so that the shaping die remains at least indirectly in contact with the main body during the entire tube hydroforming process.

It is proposed here to fill the interior between the film or multilayer composite film and the main body with a fluid as part of the internal high-pressure process and to pressurize it. In this context, pressures of between 1.5 and 10 bar are envisaged, preferably pressures of between 2 and 8 bar, preferably pressures of between 3 and 7 bar, and more preferably pressures of between 4 and 6 bar.

So that the fluid cannot escape from the interior during tube hydroforming, it is proposed to seal the main body by means of a sealing tool in the direction of the cooling medium inflow and/or the cooling medium outflow, with the sealing tool providing a fluid inlet to the interior by means of which the fluid can flow into the interior.

The film or composite film is preferably shaped in the same work cycle as the welding between the film or multilayer composite film and the main body.

Advantageously, the film or multilayer composite film can be shaped at its designated place of use, with at least indirect contact of the shaping die with the main body improving any tolerances between the designated battery module and the film or multilayer composite film. In particular, the tolerances of the manufacturing process that are caused by the separate shaping of the film and/or main body and welding are limited by the method proposed here. In particular, the maximum tolerance between the battery module intended to be connected to the main body and the film or multilayer composite film can be reduced.

The shaping die is particularly preferably connected at least indirectly to the main body by means of a connecting element during the shaping of the film or multilayer composite film. In particular, the shaping die is connected to the main body by means of at least one screw, in particular connected by means of a plurality of screws, before the shaping, with one screw preferably being operatively connected to a connecting element of the main body, in particular a module screw point, which is also designated for the fastening of the battery module.

In this way, any tolerance resulting from the distortion of the main body can advantageously be compensated for by the shaping of the film or the multilayer composite film by means of the fixed relative position between the main body and the shaping die, so that the shaped film or the shaped multilayer composite film ideally interacts with the main body intended to be fastened to the battery module.

The three-dimensionally shaped film or the three-dimensionally shaped multilayer composite film and the main body are preferably interlockingly connected to one another.

Advantageously, it is thus not necessary for the film or the multilayer composite film or the multilayer composite film having a layer consisting of plastic to be suitable for welding to the main body.

According to a particularly expedient embodiment, a pressure difference test is carried out after the film or multilayer composite film and main body have been connected.

In this regard, the following is explained conceptually:

A "pressure difference test" should be understood to mean a test of the connection between the main body and the film or multilayer composite film and/or the film or the multilayer composite film, with the interior between the film or multilayer composite film and the main body being filled with a fluid that takes on a pressure that is greater than the ambient pressure. The differential pressure relative to the ambient pressure is preferably 0.2 bar, more preferably 0.4 bar, even more preferably 0.6 bar, even more preferably 0.8 bar, particularly preferably 1.0 bar, and more particularly preferably 1.2 bar.

Preferably, the contact region of the film or multilayer composite film designed for contact with a battery module is supported by a support tool during the pressure difference test. As a result, the film or multilayer composite film can be supported in the region of the contact region, so that the differential pressure acts substantially on the edge regions and/or the connection of the film or multilayer composite film with the main body, as a result of which the connecting region in particular, preferably the welding of the main body and the film or multilayer composite film, can be tested without risking overload of the designated contact region at the necessary test pressure. Furthermore, the support tool enables a simulation of the conditions during the designated use of the battery cooling element in a designated battery module unit.

The pressure difference test is preferably carried out in the same work cycle as the shaping of the film or multilayer composite film.

Furthermore, the pressure difference test is preferably carried out in the same work cycle as the shaping of the film or multilayer composite film and the welding of the film or multilayer composite film.

Advantageously, a pressure difference test enables quality control.

It should be understood that a battery cooling element which has been produced using a method according to the third aspect of the invention is also proposed here.

It should be explicitly noted that the subject matter of the third aspect can advantageously be combined with the subject matter of the preceding aspects of the invention, both individually and cumulatively in any combination.

Figure 2:
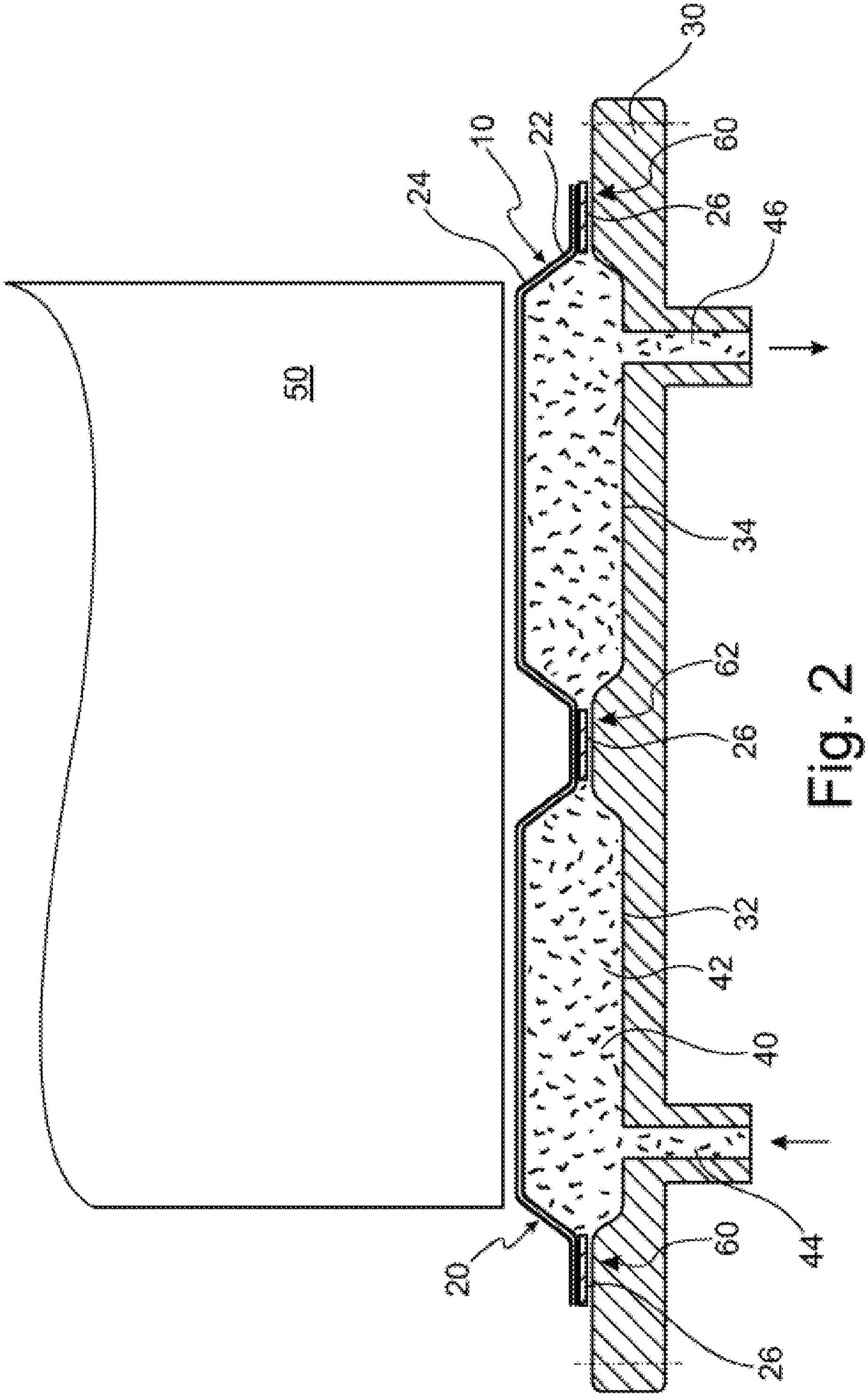
Figure 3:
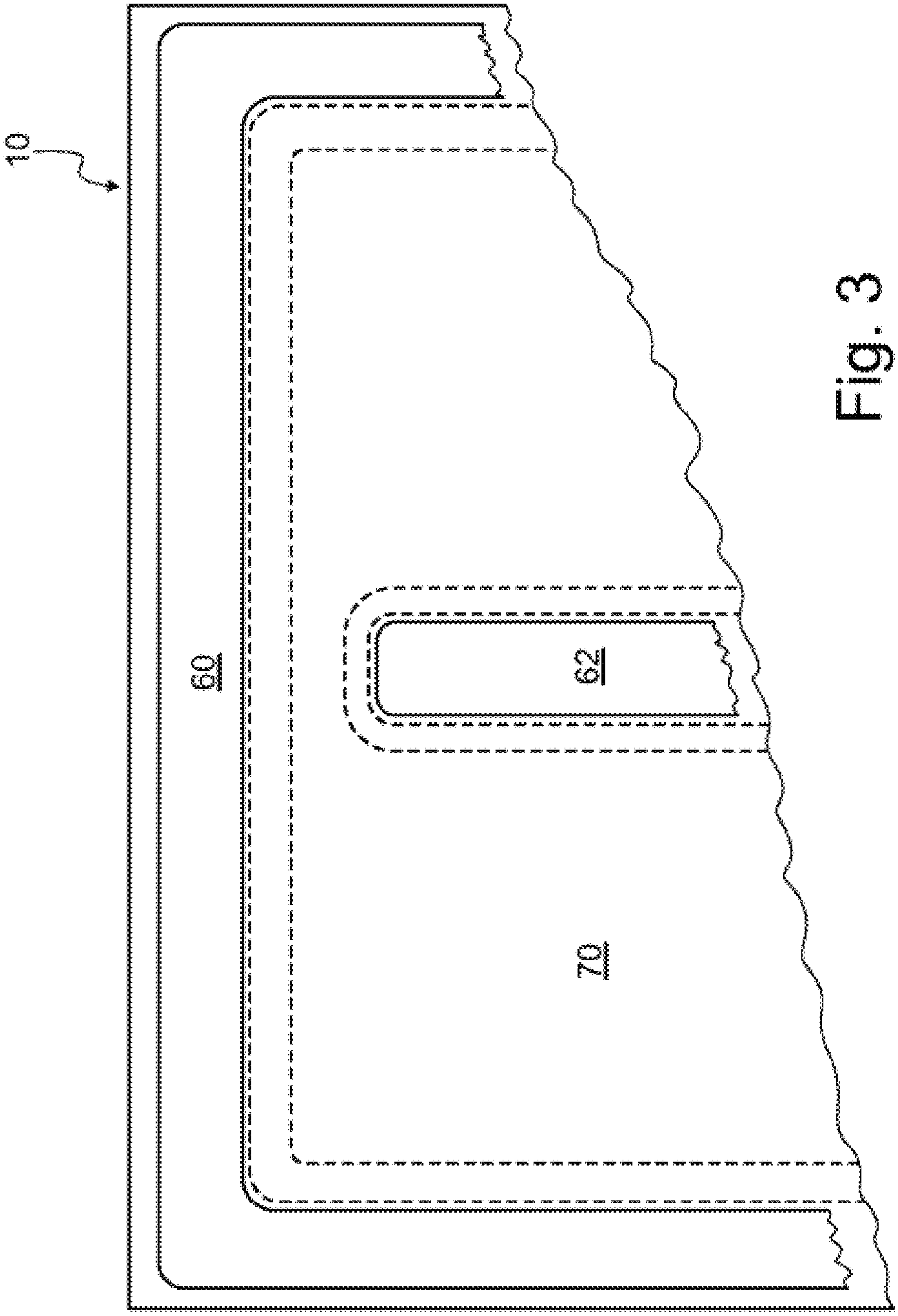
Figure 4:
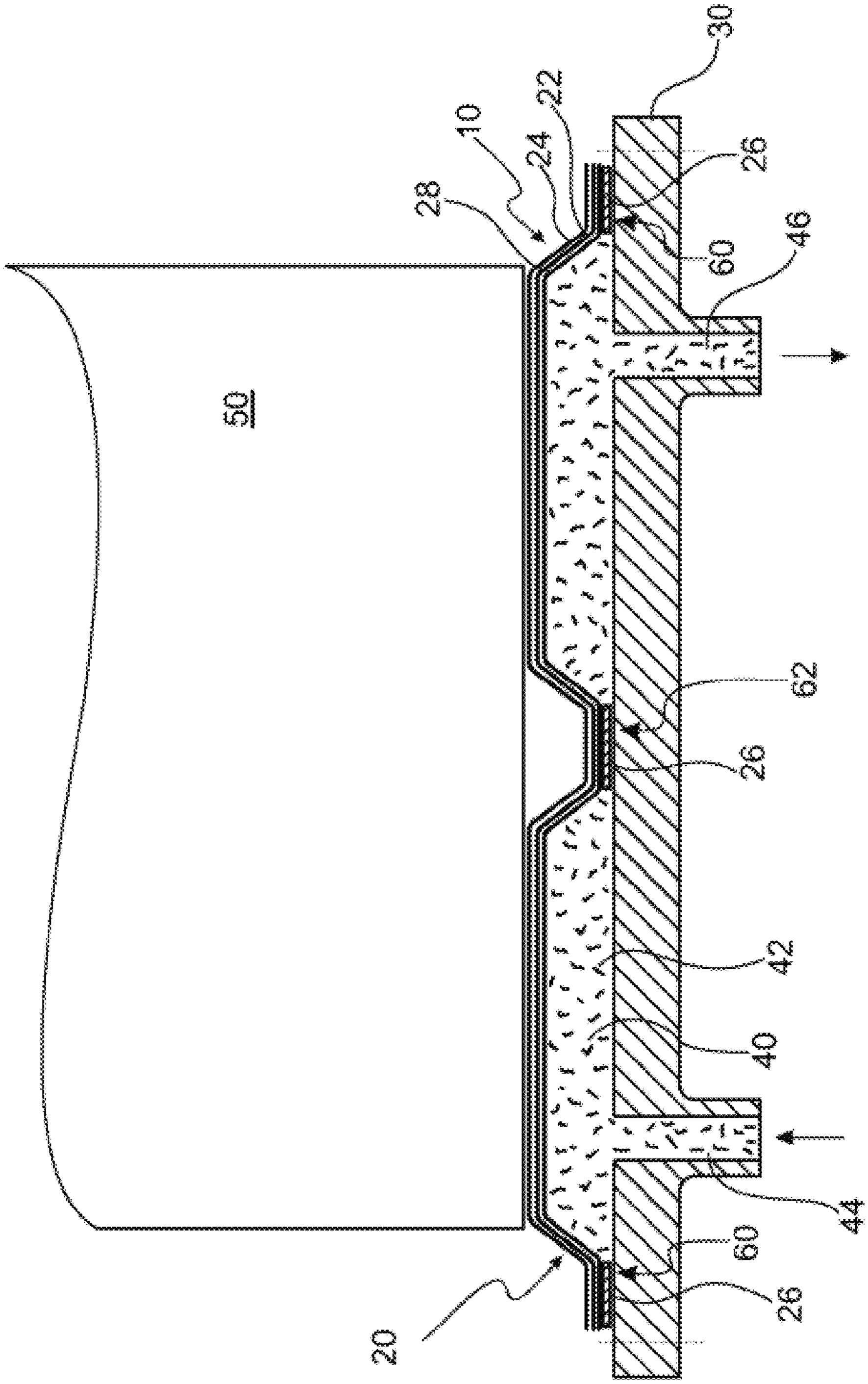
Figure 5:
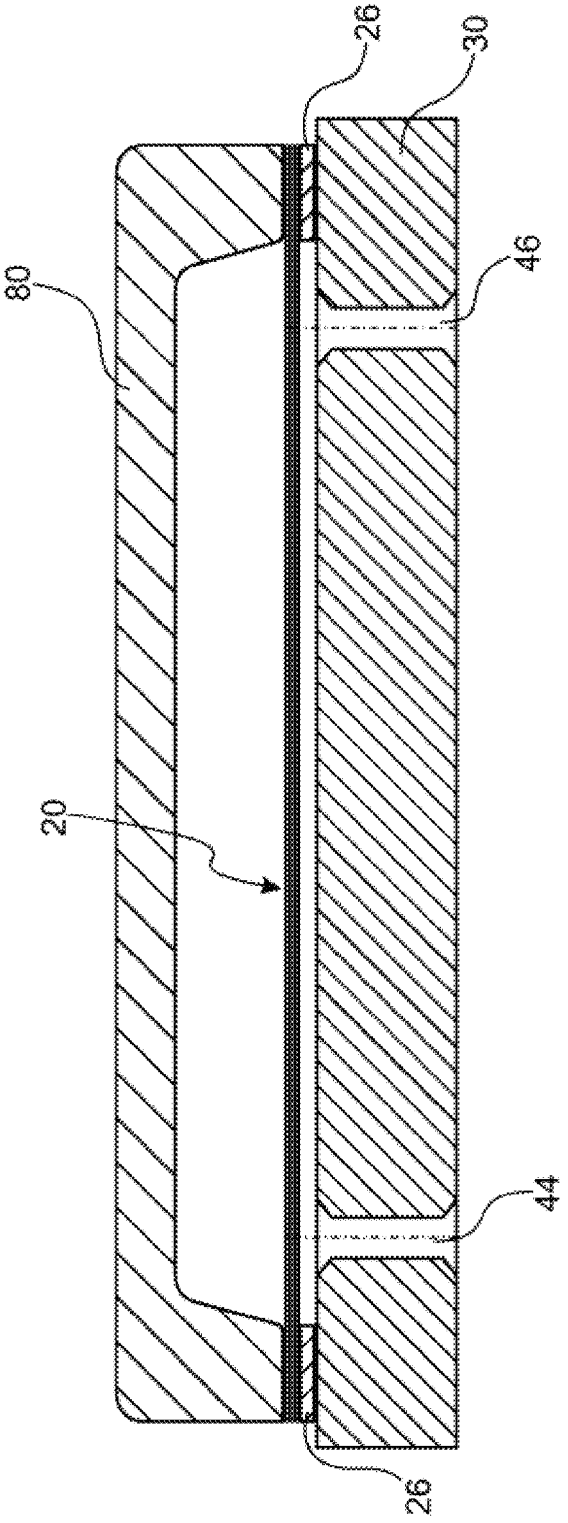
Figure 6:
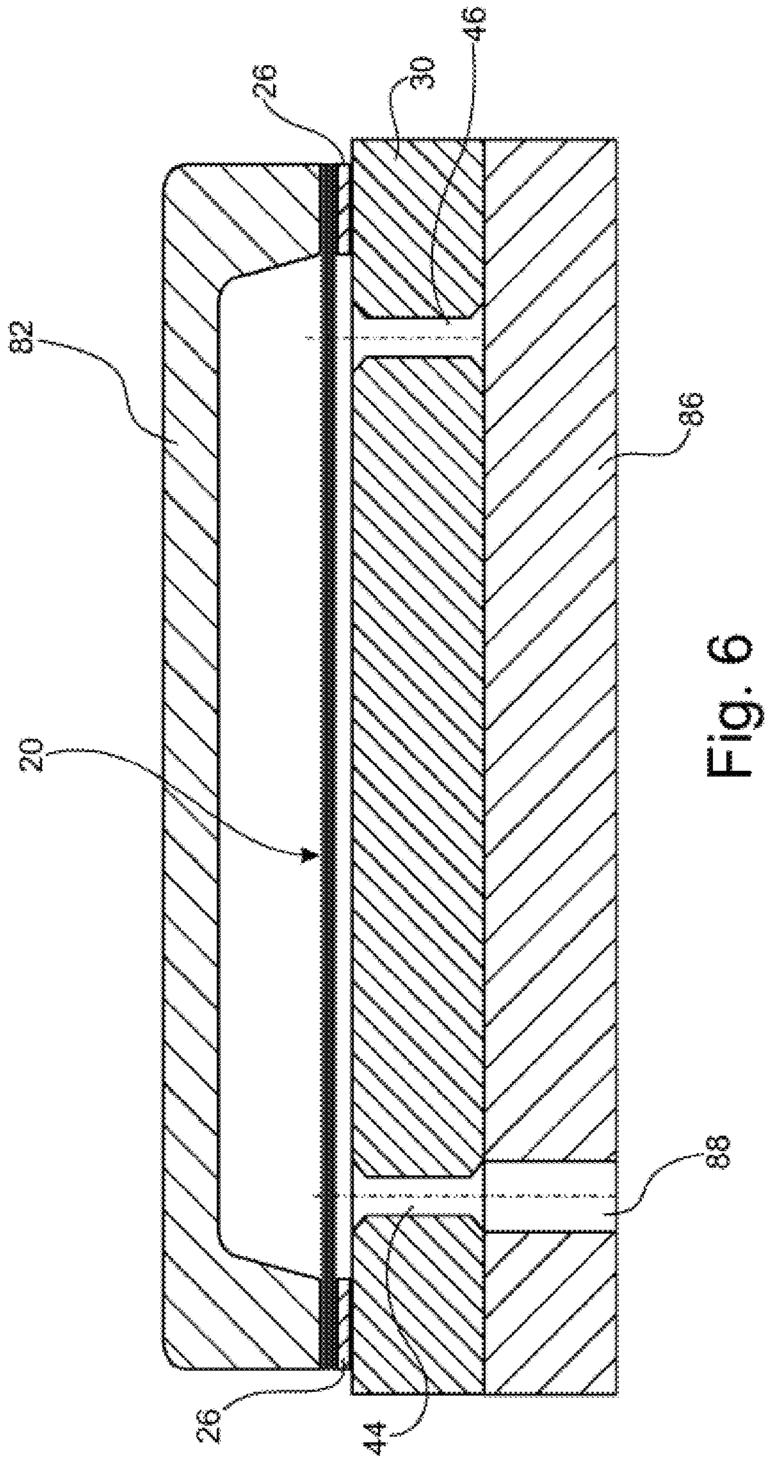
Figure 7:
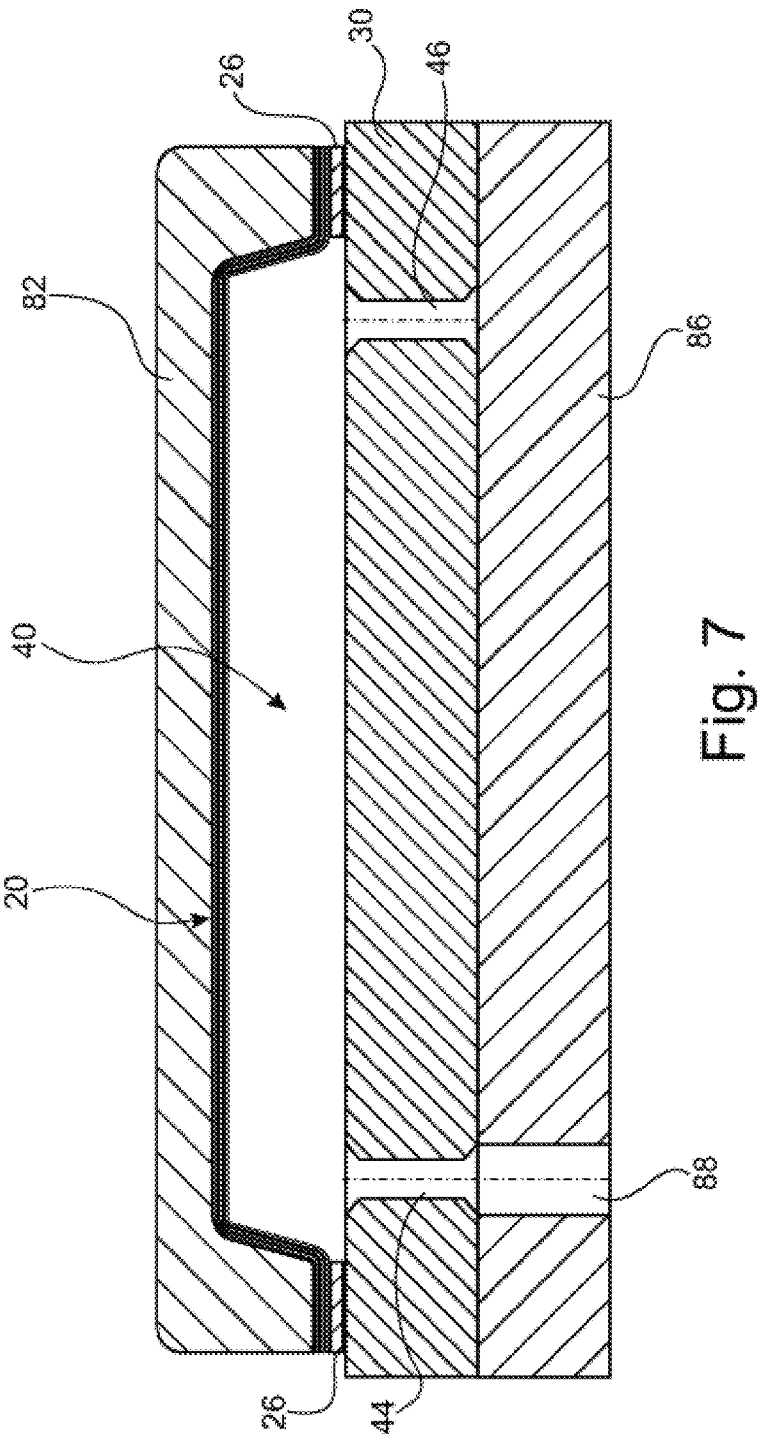
Figure 8:
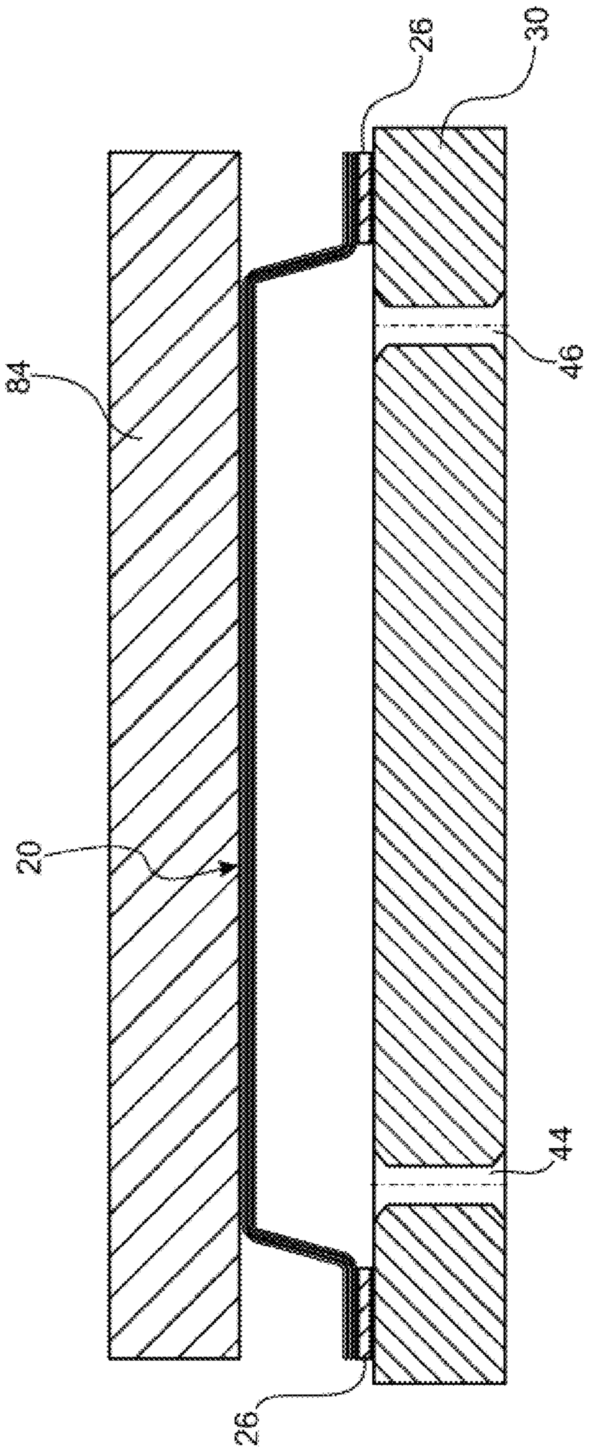
Figure 9:
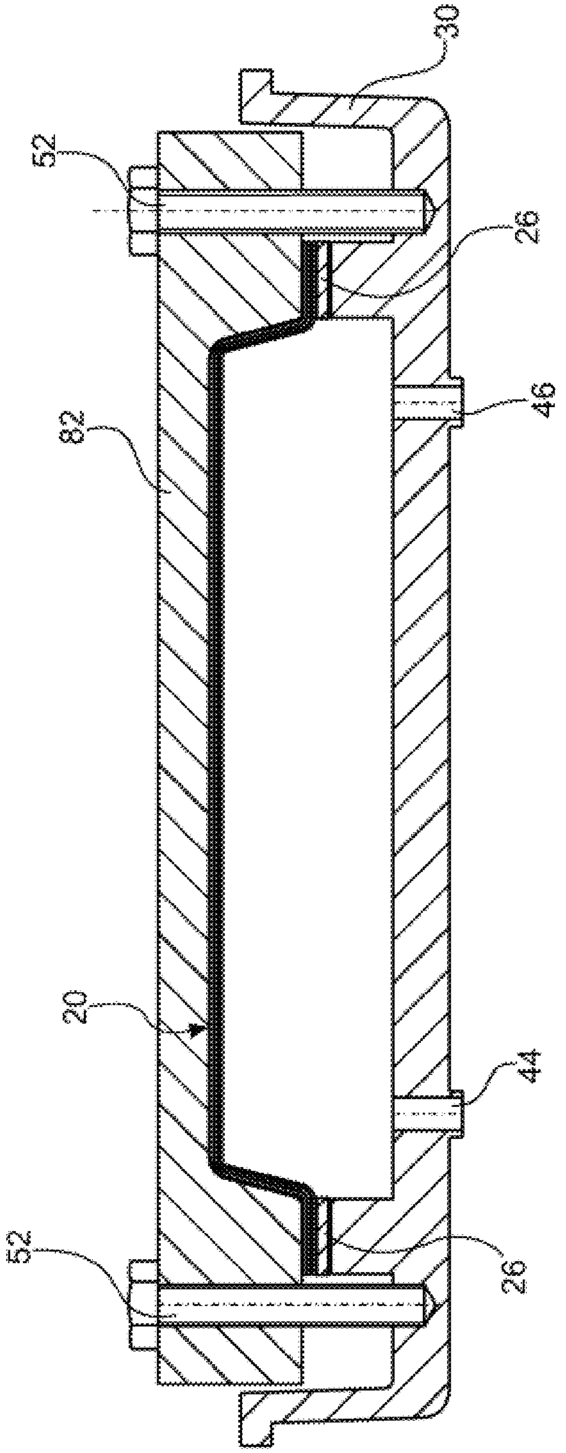

Further advantages, details, and features of the invention can be found below in the described embodiments. The drawings show, in detail, the following:

FIG. 1: a schematic view of a battery cooling element and a battery module;

FIG. 2: a schematic view of an alternative battery cooling element and a battery module;

FIG. 3: a schematic plan view of a battery cooling element;

FIG. 4: a schematic view of another alternative battery cooling element and a battery module;

FIG. 5: a schematic view of a welding tool for welding a battery cooling element;

FIG. 6: a schematic view of a shaping die and a sealing tool for shaping a film or a multilayer composite film;

FIG. 7: a schematic view of a film or multilayer composite film shaped on a battery cooling element with a tool according to FIG. 6;

FIG. 8: a schematic view of a film shaped on a battery cooling element film with a support tool for a differential pressure test; and FIG. 9: a schematic view of a battery cooling element with a shaping die which is connected to the main body.

In the following description, the same reference signs denote the same components or features; in the interest of avoiding repetition, a description of a component made with reference to one drawing also applies to the other drawings. Furthermore, individual features that have been described in connection with one embodiment can also be used separately in other embodiments.

The battery cooling element 10 in FIG. 1 consists substantially of a three-dimensionally shaped multilayer composite film 20 and a main body 30, the three-dimensionally shaped multilayer composite film 20 and the main body 30 being connected, in particular welded, to one another over part of the surface thereof.

Together, the main body 30 and the three-dimensionally shaped multilayer composite film 20 form an interior 40 intended for receiving a cooling medium 42 which is intended to be able to flow into the interior 40 through the cooling medium inflow 44 and flow out of the interior 40 through the cooling medium outflow 46.

When the battery cooling element 10 is used as intended, the battery cooling element 10, in particular the three-dimensionally shaped multilayer composite film 20 of the battery cooling element 10, comes into contact with a battery module 50 or a battery cell (not shown).

The three-dimensionally shaped multilayer composite film 20 preferably has a metal material layer 22 which faces the interior 40 and a plastics material layer 24 which faces away from the interior and is intended to come into contact with the battery module 50.

Furthermore, the three-dimensionally shaped multilayer composite film 20 has a plastics material layer 26 over part of the surface thereof by means of which the three-dimensionally shaped multilayer composite film 20 is connected, in particular welded, to the main body 30.

The battery cooling element 10 in FIG. 2 is characterized in that the main body 30 has the indentations 32, 34, which advantageously allow the three-dimensionally shaped multilayer composite film 20 to have a smaller deformation (not labeled) to form the interior 40.

The plan view of the battery cooling element 10 in FIG. 3 has the regions 60, 62 in which the three-dimensionally shaped multilayer composite film (not labeled) is connected, in particular welded, to the main body (not labeled).

Furthermore, the plan view of the battery cooling element 10 in FIG. 3 has the region 70 in which the battery cooling element 10, in particular the three-dimensionally shaped multilayer composite film (not labeled), is intended to come into contact with a battery module.

In the battery cooling element 10 in FIG. 4, the three-dimensionally shaped multilayer composite film 20 preferably has a plastics material layer 28 which faces the interior 40, preferably a plastics material layer 28 which extends over the entire surface thereof, preferably a plastics material layer 28 which is thin compared with the plastics material layer 26, and a plastics material layer 24 which faces away from the interior and is designated to come into contact with the battery module 50.

The welding tool 80 in FIG. 5 is designed for welding the film or the multilayer composite film 20 to the main body 30 of a battery cooling element 10. For this purpose, a plastics material layer 26 which is compatible with the material of the main body 30 is preferably sprayed on at the points of the film or the multilayer composite film 20 intended for welding, so that the film or the multilayer composite film 20 can be welded to the main body 30.

The welding tool 80 can be designed as a hot stamp and/or as an ultrasonic welding tool and/or as a high-frequency welding tool.

The shaping die 82 in FIG. 6 and FIG. 7 is designed for shaping the film or the multilayer composite film 20, in particular by means of a tube hydroforming process. FIG. 6 shows the arrangement before shaping and FIG. 7 shows the arrangement after shaping the film or the multilayer composite film 20.

For this purpose, the shaping die 82 is pressed at least indirectly against the base plate 30 by means of a holding force. The shaping die 82 preferably presses directly against the welding region. The holding force is preferably determined on the basis of the pressure acting in the interior 40 during shaping, so that the shaping die 82 does not lose the at least indirect contact with the main body 30 and/or the direct contact with the welding region.

A sealing tool 86 is preferably provided to seal the main body 30 in the direction of the cooling medium inflow 44 and/or the cooling medium outflow 46 during the shaping of the film or the multilayer composite film 20. Said sealing tool particularly preferably has a fluid connection 88, by means of which a fluid for shaping the film or the multilayer composite film can flow into the interior 40. In this case, preferably the cooling medium outflow 46, or alternatively (not shown) the cooling medium inflow 44, is sealed off by the sealing tool 86.

The support tool 84 in FIG. 8 is designed to support the contact region of the film or multilayer composite film 20, preferably during a pressure difference test of the battery cooling element. This contact region of the film or multilayer composite film 20 is itself designed for contact with a designated battery module (not shown).

By means of the support tool 84, the film or multilayer composite film 20 can be supported in the region of the contact region, so that the differential pressure acts substantially on the edge regions and/or the connection of the film or multilayer composite film 20 with the main body 30, as a result of which the connecting region in particular, preferably the welding of the main body 30 and the film or multilayer composite film 20, can be tested without risking overload of the designated contact region at the necessary test pressure.

The battery cooling element in FIG. 9 has a shaping die 82 which is connected at least indirectly to the main body 30 by means of at least one connecting means 52 in order to shape the film or the multilayer composite film 20. In this way, any tolerance resulting from the distortion of the main body 30 can advantageously be compensated for by the shaping of the film or the multilayer composite film 20 by means of the fixed relative position between the main body 30 and the shaping die 82, so that the shaped film or the shaped multilayer composite film 20 can ideally interact with the battery module (not shown) intended to be fastened to the main body 30.

LIST OF REFERENCE SIGNS

10 battery cooling element
20 multilayer composite film
22 metal material layer
24 plastics material layer outward
26 plastics material layer/welding region
28 plastics material layer inward
main body
32 indentation
34 indentation
40 interior
42 cooling medium
44 cooling medium inflow
46 cooling medium outflow
50 battery module
52 connecting means
60 region
62 region
70 region
80 welding tool
82 shaping die
84 support tool
86 sealing tool
88 fluid connection

The invention claimed is:

1. A battery cooling element for a traction battery, the battery cooling element comprising:
a main body, and
a multilayer composite film including:
a first outwardly oriented plastic material layer, and
a metal material layer covered by the first plastic material layer, the metal material layer to improve electromagnetic compatibility,
wherein the main body and the multilayer composite film at least partially enclose an interior of the battery cooling element for receiving a cooling medium, the interior being connected to a cooling medium inflow and a cooling medium outflow,
wherein the multilayer composite film is three-dimensionally shaped,
wherein the first plastic material layer includes one or more of polyethylene (PE), polyamide (PA), or polypropylene (PP), and
wherein the multilayer composite film has a first region to contact at least a portion of the traction battery and a second region to couple the multilayer composite film to the main body, the first region having a higher heat transfer coefficient than the second region, the second region being adjacent to the first region.

2. The battery cooling element according to claim 1, wherein the main body has a groove and/or an indentation.

3. The battery cooling element according to claim 1, wherein the multilayer composite film has a welding region.

4. The battery cooling element according to claim 1, wherein the metal material layer has aluminum as an alloy component, the metal material layer having an aluminum content of more than 85 wt. %.

5. The battery cooling element according to claim 1, wherein a region of the multilayer composite film is configured for contact with a battery module and/or a battery cell.

6. The battery cooling element according to claim 1, wherein the second region of the multilayer composite film is welded to the main body.

7. The battery cooling element according to claim 1, wherein the first plastic material layer is pseudoplastic.

8. The battery cooling element according to claim 1, wherein the main body consists of LDPE, PE, PA, or PP.

9. The battery cooling element according to claim 1, wherein the main body has a fastening element for fastening a battery cell and/or a battery module.

10. The battery cooling element according to claim 1, wherein the main body is configured as a load-bearing element of a battery module unit.

11. The battery cooling element according to claim 1, wherein the main body is configured as a component of a housing of a battery module unit.

12. The battery cooling element according to claim 1, wherein the battery cooling element is embodied in a battery module unit.

13. The battery cooling element according to claim 1, wherein the first plastic material layer includes PE.

14. The battery cooling element according to claim 1, wherein the first plastic material layer includes PA.

15. The battery cooling element according to claim 1, wherein the first plastic material layer includes PP.

16. The battery cooling element according to claim 1, wherein the second region of the multilayer composite film is coupled to the main body via a layer of plastic material.

17. The battery cooling element according to claim 1, wherein the first region of the multilayer composite film does not include a plastic layer facing the interior.

18. The battery cooling element according to claim 1, wherein a surface of the metal material layer that faces the interior and that is defined by the first region is configured to directly contact the cooling medium to thereby provide the higher heat transfer coefficient for the first region.

19. The battery cooling element according to claim 1, wherein the multilayer composite film is deep-drawn.

* * * * *